(12) United States Patent
Sheng et al.

(10) Patent No.: US 9,921,818 B2
(45) Date of Patent: Mar. 20, 2018

(54) METHOD AND APPARATUS OF DOWNLOADING AND INSTALLING A CLIENT

(71) Applicant: Alibaba Group Holding Limited, Grand Cayman (KY)

(72) Inventors: Jiaoqi Sheng, Hangzhou (CN); Chao Feng Meng, Hangzhou (CN); Ke Wang, Hangzhou (CN); Xiaoshuang Zhou, Hangzhou (CN); Peiyuan Yang, Hangzhou (CN)

(73) Assignee: Alibaba Group Holding Limited

( * ) Notice: Subject to any disclaimer, the term of this patent is extended or adjusted under 35 U.S.C. 154(b) by 138 days.

(21) Appl. No.: 14/484,139

(22) Filed: Sep. 11, 2014

(65) Prior Publication Data
US 2015/0074660 A1 Mar. 12, 2015

(30) Foreign Application Priority Data

Sep. 12, 2013 (CN) .......................... 2013 1 0415526

(51) Int. Cl.
G06F 9/44 (2006.01)
G06F 9/445 (2018.01)
H04L 29/08 (2006.01)

(52) U.S. Cl.
CPC .............. *G06F 8/61* (2013.01); *H04L 67/34* (2013.01); *H04L 67/10* (2013.01); *H04L 67/26* (2013.01)

(58) Field of Classification Search
CPC .................................. G06F 9/44; G06F 9/445
USPC ................................................. 717/168–178
See application file for complete search history.

(56) References Cited

U.S. PATENT DOCUMENTS 6,157,953 A * 12/2000 Chang et al. ................. 709/225
6,963,908 B1 * 11/2005 Lynch ................. G06F 9/44505
                                                                               709/220
7,451,313 B1 * 11/2008 Chang ................... G06F 21/121
                                                                               713/168

(Continued)

OTHER PUBLICATIONS

PCT Search Report and Written Opinion dated Nov. 24, 2014 for PCT Application No. PCT/US14/55246, 10 Pages.

*Primary Examiner* — Jae Jeon
(74) *Attorney, Agent, or Firm* — Lee & Hayes, PLLC

(57) ABSTRACT

Disclosed are a method and an apparatus of downloading and installing a client. The method includes: upon receiving a request message of downloading client software that includes an identifier of the client software from a user terminal, a server obtaining account information of a user and installation information of the client software corresponding to the identifier of the client software, and sending the obtained account information and installation information of the client software to the user terminal. As such, when pushing the installation information of the client software to the user terminal, the server also provides the account information that is used for login of the client software to the user terminal, thus shortening the tedious procedure of re-registering the account information used for logging into the client software by the user, speeding up the user login of the client software and effectively improving user experience without the need of repeatedly registering the account information by the user. This saves the storage space of an application server and improves the storage capability of the application server.

13 Claims, 8 Drawing Sheets

(56) References Cited

U.S. PATENT DOCUMENTS

| | | | |
|---|---|---|---|
| 2001/0039565 A1* | 11/2001 | Gupta | G06F 9/54 709/203 |
| 2005/0138158 A1 | 6/2005 | Challener et al. | |
| 2006/0031172 A1* | 2/2006 | Otsuka | G06F 21/10 705/59 |
| 2006/0129445 A1* | 6/2006 | McCallum, Jr. | G06Q 10/10 705/7.18 |
| 2007/0124358 A1 | 5/2007 | Levi et al. | |
| 2007/0162503 A1* | 7/2007 | Hou | G06F 8/60 |
| 2007/0169114 A1* | 7/2007 | Birk Olsen | G06F 8/61 717/174 |
| 2008/0005026 A1* | 1/2008 | Cross et al. | 705/51 |
| 2008/0148376 A1* | 6/2008 | Onozawa | G06F 21/41 726/8 |
| 2009/0172160 A1* | 7/2009 | Klein | 709/225 |
| 2009/0183151 A1* | 7/2009 | Gharabally | G06F 8/61 717/178 |
| 2009/0249076 A1* | 10/2009 | Reed et al. | 713/181 |
| 2010/0088696 A1 | 4/2010 | Stoev et al. | |
| 2010/0242037 A1* | 9/2010 | Xie | G06F 8/61 717/178 |
| 2011/0179411 A1 | 7/2011 | Lederer | |
| 2011/0202915 A1* | 8/2011 | Kuroyanagi | 717/178 |
| 2012/0291023 A1 | 11/2012 | Lu et al. | |
| 2013/0019237 A1* | 1/2013 | Pardehpoosh | G06Q 30/0609 717/171 |
| 2013/0151411 A1* | 6/2013 | Carten | 705/44 |
| 2014/0033286 A1* | 1/2014 | Zhang | H04L 63/083 726/7 |
| 2014/0141751 A1* | 5/2014 | Zhang | 455/411 |
| 2014/0189808 A1* | 7/2014 | Mahaffey et al. | 726/4 |
| 2014/0201730 A1 | 7/2014 | Biswas et al. | |
| 2014/0280859 A1* | 9/2014 | Liu | H04L 67/06 709/223 |
| 2014/0344803 A1* | 11/2014 | Wang et al. | 717/178 |

* cited by examiner

METHOD AND APPARATUS OF DOWNLOADING AND INSTALLING A CLIENT

CROSS REFERENCE TO RELATED PATENT APPLICATION

This application claims foreign priority to Chinese Patent Application No. 201310415526.1 filed on Sep. 12, 2013, entitled "Method and Apparatus of Downloading and Installing a Client", which is hereby incorporated by reference in its entirety.

TECHNICAL FIELD

The present disclosure relates to the field of Internet information processing, and more particularly, to methods and apparatuses of downloading and installing a client.

BACKGROUND

With the development of Internet technologies, a user downloads installation information of a desired client via different website servers, where methods of obtaining the installation information of the client include, but are not limited to, two types as follows: one method involves the user downloading the installation information of the client from a website server of a client developer; and the other method involves the user downloading the installation information of the client from a third party server delegated by the client developer.

For example, for downloading installation information of an Alipay client, a user who wants to download the Alipay may log into an application server of an Alipay website in which the Alipay client is located, and download the installation information from the application server of the Alipay website; or may log into a third party server (such as Apple Store), and download the installation information from the third party server.

In other words, when downloading installation information of a client, a user first needs to log into an application server that has the installation information of the client, and then downloads the installation information of the client after logging into the application server.

After downloading the installation information of the client, the user completes installation of the client locally (e.g., in a mobile terminal or a computing device of the user). When the client is used after the installation, the user generally needs to register account information that is used for logging in the client, where the account information registered for logging in the client is stored in an application server to which the client belongs, so as to provide a security guarantee for subsequent use of the client by the user.

However, the following deficiencies exist: since the procedure of registering account information is relatively tedious, user experience is poor when a user uses a client for the first time, thus affecting subsequent use of the client by the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a method and an apparatus of delivering user information and installing a client, which are used to solve the problem of relatively poor user experience during the use of a client due to the tedious procedure of re-registering account information for logging into the client after downloading installation information of the client and successful installation thereof in existing technologies.

A method of downloading a client includes:
receiving, by a server, a request message of downloading client software from a user terminal, wherein the request message of downloading includes an identifier of the client software;
obtaining account information of a user and installation information of the client software that corresponds to the identifier of the client software; and
sending, to the user terminal, the obtained installation information of the client software that corresponds to the identifier of the client software and the obtained account information.

Obtaining the account information of the user includes:
determining, by the server, the account information of the user based on login status of the user with respect to the server.

Obtaining the account information of the user further includes determining the account information of the user based on the login status information of the user with respect to the server and determining whether the user has login account information in a client software downloading server in real time. This facilitates the user to use the same account information for client software that is downloaded from the same server, reduces an amount of account information stored in the server and saves the storage space of the server, without the need of memorizing too much account information by the user when using the client software downloaded from the same server, thus improving user experience.

Determining the account information of the user by the server based on the login status information of the user with respect to the server includes:
when the login status of the user with respect to the server corresponds to a status that indicates having already logged in, determining the login account information which is used by the user to log in the server; and
when the login status of the user with respect to the server corresponds to a status that indicates no logging in yet, sending a login page to the user terminal and determining the login account information which is used by the user to log in the server via the login page.

The request message of downloading the client software further includes additional information, wherein the additional information is used for representing event information that indicates a need to use the client software to perform a subsequent operation.

Sending the obtained installation information of the client software and the obtained account information to the user terminal by the server includes:
sending, by the server, received additional information, the obtained installation information of the client software and the obtained account information to the user terminal.

It is further pointed out that the server sends the additional information generated by the user and the installation information of the client software to the user terminal, so that, after the installation of the client software is completed, the user directly loads the received additional information, thus improving the efficiency of using the client software by the user.

A method of installing a client includes:

receiving account information and installation information that is used for installing client software from a server;

installing the client using the received installation information of the client; and when the client is completed with installation and is started, completing login using the received account information.

After installing the client software, a user logs into the client using the received account information, thus shortening the tedious procedure of re-registering the account information for logging into the client software by the user and effectively improving user experience without the need of performing registration again. Furthermore, new account information is not generated, thus saving the storage space of the server and improving the storage capability of the server.

Logging into the client using the received account information includes:

sending a message of login request to an application server, the application server being used for processing the login request of the user, wherein the message of login request includes the account information; and in response to receiving a message indicating successful verification of the account information returned from the application server, completing login.

Logging into the client using the received account information further includes sending the received account information to the application server for verification, which ensures the security for the user to log into the client.

Logging into the client using the received account information includes:

sending a message of login request to an application server, the application server being used for processing the login request of the user, wherein the message of login request includes the account information of the user and identifier information or address information of the server;

determining, by the application server, whether the received account information is locally stored account information, and upon determining that the received account information is not the locally stored account information, sending a message for verifying the account information to the server based on the identifier information or address information of the server; and completing login upon receiving a message indicating successful verification of the account information returned from the server, wherein the message indicating the successful verification of the account information is sent to the application server after the server performs and passes verification based on the received account information.

Logging in to the client using the received account information further includes sending the received account information to a third party server for verification, which ensures the security for the user to log into the client.

The method further includes:

receiving additional information from the server, where the additional information is used for representing event information that indicates a need to use the client software to perform a subsequent operation.

After the client is completed with installation and started, the method further includes:

after the user logs into the client using the received account information, loading the received additional information into the client and performing the subsequent operation.

An apparatus includes:

a receiving module used for receiving a request message of downloading client software from a user terminal, wherein the request message of downloading includes an identifier of the client software;

an acquisition module used for obtaining account information of a user and installation information of the client software that corresponds to the identifier of the client software; and a sending module used for sending the obtained installation information of the client software that corresponds to the identifier of the client software and the obtained account information to the user terminal.

The acquisition module is specifically used for determining the account information of the user based on a login status of the user with respect to the server.

The acquisition module is specifically used for:

when the login status of the user with respect to the server corresponds to a status that indicates having already logged in, determining the login account information which is used by the user to log into the server; and when the login status of the user with respect to the server corresponds to a status that indicates no login yet, sending a login page to the user terminal and determining the login account information which is used by the user to log into the server via the login page.

The request message of downloading the client software further includes additional information, wherein the additional information is used for representing event information that indicates a need to use the client software to perform a subsequent operation.

The sending module is specifically used for sending received additional information, the obtained installation information of the client software and the obtained account information to the user terminal.

A client device includes:

a receiving module used for receiving account information and installation information that is used for installing client software from a server;

an installation module used for installing the client using the received installation information of the client; and a login module used for logging into the client using the received account information when the client is completed with installation and is started.

After installing the client software, the user logs into the client using the received account information, thus shortening the tedious procedure of re-registering the account information for logging into the client software by the user and effectively improving user experience without the need of performing registration repeatedly. Furthermore, new account information is not generated, thus saving the storage space of an application server and improving the storage capability of the application server.

The login module is specifically used for sending a login request message to an application server, the application server being used for processing a login request of the user, wherein the login request message includes the account information; and completing login upon receiving a message indicating successful verification of the account information returned from the application server.

Logging into the client using the received account information further includes sending the received account information to the application server for verification, which ensures the security for the user to log into the client.

The login module is specifically used for sending a login request message to an application server, the application server being used for processing a login request of the user, wherein the login request message includes the account information of the user and identifier information or address information of the server. The application server determines whether the received account information is locally stored account information, sends a message of verifying the account information to the server based on the identifier information or address information of the server upon determining that the received account information is not the locally stored account information; and completes login upon receiving a message indicating successful verification of the account information returned from the server, wherein the message indicating the successful verification of the account information is sent to the application server after the server performs and passes the verification based on the received account information.

Logging in to the client using the received account information further includes sending the received account information to a third party server for verification, which ensures the security for the user to log into the client.

The client device further includes:

an additional information receiving module used for receiving additional information from the server, where the additional information is used for representing event information that indicates a need to use the client software to perform a subsequent operation.

The apparatus further includes:

an additional information loading module used for: after the client is completed with installation and is started and after the client is logged in using the received account information, loading the received additional information to the client and performing the subsequent operation.

The present disclosure includes the following benefits:

In the embodiments of the present disclosure, upon receiving a request message of downloading client software that includes an identifier of the client software from a user terminal, a server obtains account information of a user and installation information of the client software corresponding to the identifier of the client software, and sends the obtained account information and installation information of the client software to the user terminal. As such, when pushing the installation information of the client software to the user terminal, the server also provides the account information that is used for login of the client software to the user terminal, thus shortening the tedious procedure of re-registering the account information used for logging into the client software by the user, speeding up the user login of the client software and effectively improving user experience without the need of repeatedly registering the account information by the user. This saves the storage space of an application server and improves the storage capability of the application server.

DETAILED DESCRIPTION

In order to achieve the objectives of the present disclosure, embodiments of the present disclosure provide a method and an apparatus of downloading and installing a client. After receiving a request message of downloading client software that includes an identifier of the client software from a user terminal, a server obtains account information of a user and installation information of the client software corresponding to the identifier of the client software, and sends the obtained account information and installation information of the client software to the user terminal. As such, when pushing the installation information of the client software to the user terminal, the server also provides the account information that is used for login of the client software to the user terminal, thus shortening the tedious procedure of re-registering the account information used for logging into the client software by the user, speeding up the user login of the client software and effectively improving user experience without the need of repeatedly registering the account information by the user. This saves the storage space of an application server and improves the storage capability of the application server.

It should be noted that, the user in the embodiments of the present disclosure may be a user who uses a mobile phone and desires to download a client into the mobile phone; or may be a user who uses a personal computer (PC), and desire to download a client into the PC.

The embodiments of the present disclosure are described in details hereinafter with reference to the accompanying drawings.

First Embodiment

Figure 1:
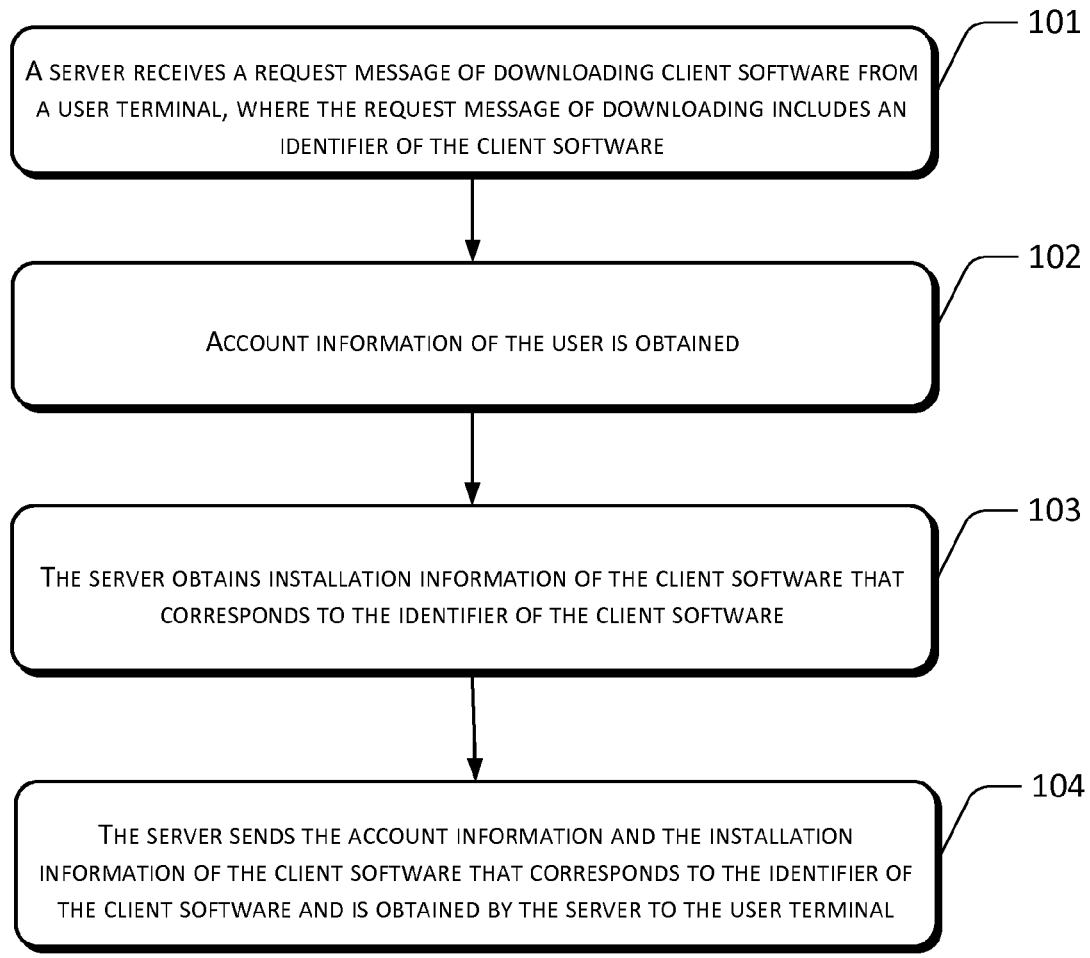
FIG. 1 is a flowchart illustrating a method of downloading a client in accordance with a first embodiment of the present disclosure.

FIG. 1 is a flowchart illustrating a method of downloading a client in accordance with the first embodiment of the present disclosure. The method includes:

Block 101: A server receives a request message of downloading client software from a user terminal, where the request message of downloading includes an identifier of the client software.

At block 101, when a user downloads client software, the user needs to use a terminal to access a server that provides installation information of the client via the Internet, and send a request message of downloading the client software to the server, where the request message of downloading includes an identifier of the client software.

The identifier is used for facilitating the server to identify a target to be downloaded of the user. In other implementations, a serial number, an attribute file, etc., of the software may be used as the identifier of the client, and the present disclosure does not impose any limitation thereon.

For example, the user needs to download Alipay client software. In this case, the user sends a download request message to an Alipay server using a mobile phone, where a name of the client is used as an identifier of the client software.

Optionally, the download request message of the client software further includes additional information.

The additional information is used for representing event information that indicates a need to use the client software to perform a subsequent operation.

For example, the download request message received by the server is a request for downloading the Alipay client. At the same time, the user initiates a transfer event, and desires to complete the transfer event using the downloaded Alipay client software. In this application scenario, the additional information includes an event type (i.e., a transfer), a transfer amount, and a payee's account number, etc.

Block 102: Account information of the user is obtained.

At block 102, after receiving the download request message from the user, the server obtains a login status of the user with respect to the server, i.e., a status indicating that the user has already logged in or a status indicating that the user has not logged in.

When the obtained login status of the user with respect to the server is a logged-in status, login account information which is used by the user to log into the server is determined, and block 103 is performed.

Alternatively, when the obtained login status of the user with respect to the server is a non-logged-in status, a login page is pushed to the user, so that the user completes a login operation via the login page. Moreover, when the user is in the logged-in status, the login account information which is used by the user to log into the server is determined, and block 103 is performed.

Optionally, the login page further includes a page for performing a fast registration operation for a user who accesses the server for the first time to perform account registration. When the user is in the logged-in status, the login account information which is used by the user to log into the server is determined, and block 103 is performed.

Specifically, the determined login account information of the user may be obtained by the server by directly receiving the account information which is directly inputted by the user during login, or may be obtained by querying a database using a login module included in the server or a login server other than the server under authorization of the user. The present disclosure does not have limitations thereon.

The account information includes, but is not limited to, user name information and login password information.

Still use the example at block 101 for illustration. When the user is in a logged-in status, the Alipay server determines whether the user has logged in using the login module, and determines the account information of the user based on the login status of the user.

It should be noted that, a server associated with installation information of the client software that is requested for download by the user includes, but is not limited to: an application server which belongs to a same Internet operator of the client to be downloaded; and a third party server which is delegated by a developer of the client to be downloaded to specially perform installation and downloading. Accordingly, the account information obtained by the server includes, but is not limited to, the following types: a first type of account information corresponding to login information used by the user to log into the application server which belongs to the same Internet operator of the client to be downloaded; and a second type of account information corresponding to login information used by the user to log into the third party server which is delegated by the developer of the client to be downloaded to specially perform installation and downloading.

It should be noted that, when obtaining the login information used by the user to log into the third party server which is delegated by the developer of the client to be downloaded to specially perform installation and downloading, identifier information and/or address information of the third party server from which the client to be downloaded is downloaded is determined at the same time.

Block 103: The server obtains installation information of the client software that corresponds to the identifier of the client software.

At block 103, the server searches for and obtains installation information corresponding to the identifier of the client software based on the identifier of the client software.

Block 104: The server sends the account information and the installation information of the client software that corresponds to the identifier of the client software and is obtained by the server to the user terminal.

Optionally, in step 104, when the received download request message further includes additional information, the server sends the received additional information, the obtained account information, and the obtained installation information, of the client software, corresponding to the identifier of the client software to the user terminal.

By using the solution of the first embodiment of the present disclosure, after receiving a request message of downloading client software that includes an identifier of the client software from a user terminal, a server obtains account information of a user and installation information of the client software corresponding to the identifier of the client software, and sends the obtained account information and installation information of the client software to the user terminal. As such, when pushing the installation information of the client software to the user terminal, the server also provides the account information that is used for login of the client software to the user terminal, thus shortening the tedious procedure of re-registering the account information used for logging into the client software by the user, speeding up the user login of the client software and effectively improving user experience without the need of repeatedly registering the account information by the user. This saves the storage space of a server and improves the storage capability of the server.

Second Embodiment

Figure 2:
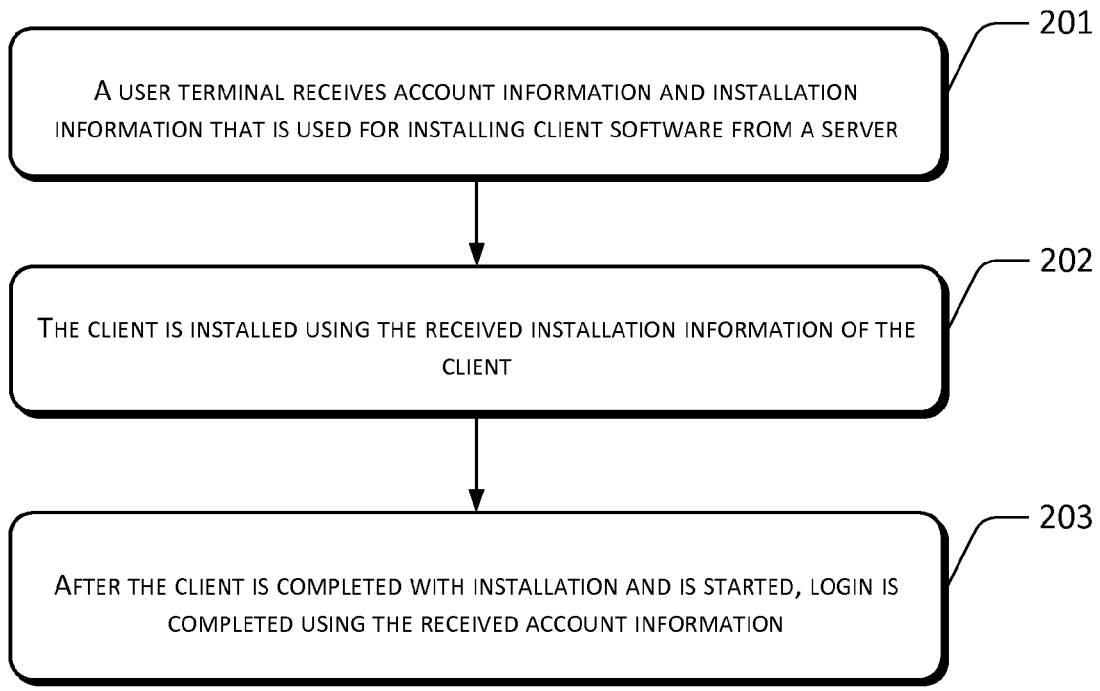
FIG. 2 is a flowchart illustrating a method of installing a client in accordance with a second embodiment of the present disclosure.

FIG. 2 is a flowchart illustrating a method of logging in a client in accordance with the second embodiment of the present disclosure. The second embodiment of the present disclosure and the first embodiment of the present disclosure are developed under a same inventive idea. The method includes:

Block 201: A user terminal receives account information and installation information that is used for installing client software from a server.

At block 201, according to the description of block 102 in the first embodiment of the present disclosure, a server associated with installation information of the client software that is requested for download by the user includes, but is not limited to: an application server which belongs to a same Internet operator of the client to be downloaded; and a third party server which is delegated by a developer of the client to be downloaded to specially perform installation and downloading. Accordingly, the account information obtained by the server includes, but is not limited to, the following types: a first type of account information corresponding to login information used by the user to log into the application server which belongs to the same Internet operator of the client to be downloaded; and a second type of account information corresponding to login information used by the user to log into the third party server which is delegated by the developer of the client to be downloaded to specially perform installation and downloading.

It should be noted that, when the account information sent from the server corresponds to login information used by the user to log into the third party server which is delegated by the developer of the installed client to specially perform installation and downloading, the received information further includes identifier information and/or address information of the third party server used for downloading the client software. The identifier information and/or the address information of the third party server is used for representing a source from which the user downloads the installation information of the client software.

For example, if a third party server for downloading the client software is an Apple Store server, the received account information sent from the server corresponds to login information used by the user to log into the Apple Store server. Furthermore, when sending the account information, the server also sends the identifier information and/or the address information of the Apple Store server to the user to facilitate the user to determine a source from which the installation information of the client software is downloaded.

Optionally, additional information sent from the server is received. The additional information is used for representing event information that indicates a need to use the client software to perform a subsequent operation.

Block 202: The client is installed using the received installation information of the client.

Block 203: After the client is completed with installation and is started, login is completed using the received account information.

At block 203, the received account information sent from the server may include, but is not limited to, the following types: a first type of account information corresponding to login information used by the user to log into the application server which belongs to the same Internet operator of the client to be downloaded; and a second type of account information corresponding to login information used by the user to log into the third party server which is delegated by the developer of the client to be downloaded to specially perform installation and downloading. Accordingly, methods of logging into the client using the received account information are also different.

When the account information received from the server corresponds to login information used by the user to log into an application server that belongs to a same Internet operator of the installed client, completing the login using the account information includes:

Firstly, a login request message is sent to the application server.

The application server is an application server which belongs to a same Internet operator of the client, being used for processing login requests of users.

The login request message includes the account information. In other words, the account information corresponds to login information used by the user to log into the application server which belongs to the same Internet operator of the installed client.

Secondly, upon receiving a message indicating successful verification of the login information returned from the application server, completing login.

When the received account information corresponds to login information used by the user to log into a third party server which is delegated by a developer of the installed client to specially perform installation and downloading, completing the login using the account information includes:

Firstly, a login request message is sent to the application server.

The application server is an application server which belongs to a same Internet operator of the client, being used for processing login requests of the users.

The login request message includes the account information. Specifically, the account information corresponds to login information used by the user to log into a third-party server which is delegated by a developer of the installed client to specially perform installation and downloading.

It should be noted that, the login request message further includes identifier information or address information of the server.

Secondly, the application server determines whether the received account information is locally stored account information, and sends a message for verifying the account information to the server based on the identifier information or the address information of the server included in the login request message upon determining that the received account information is not the locally stored account information.

Finally, in response to receiving a message indicating successful verification of the account information returned by the server, completing login.

The message indicating the successful verification of the account information is sent to the application server after the server receives the message for verification the account information, performs verification for the received account information and passes the verification.

Optionally, the received message sent from the server further includes additional information.

The additional information is used for representing event information that indicates a need to use the installed client to perform a subsequent operation.

After the client is completed with installation and is started, the method further includes:

after the user logs into the client using the received account information, loading the received additional information to the client, and performing the subsequent operation.

By using the solution of the second embodiment of the present disclosure, based on installation information of a client and account information used for logging in the client that is received from a server, the user logs into the client using the received account information after installing the client using the installation information, thus shortening the tedious procedure associated with repeatedly registering the account information of the client by the user, improving the speed of logging to the client by the user, without the need of the user to repeatedly registering the account information used for logging into the client. This saves the storage space of an application server, and improves the storage capability of the application server.

Third Embodiment

Figure 3:
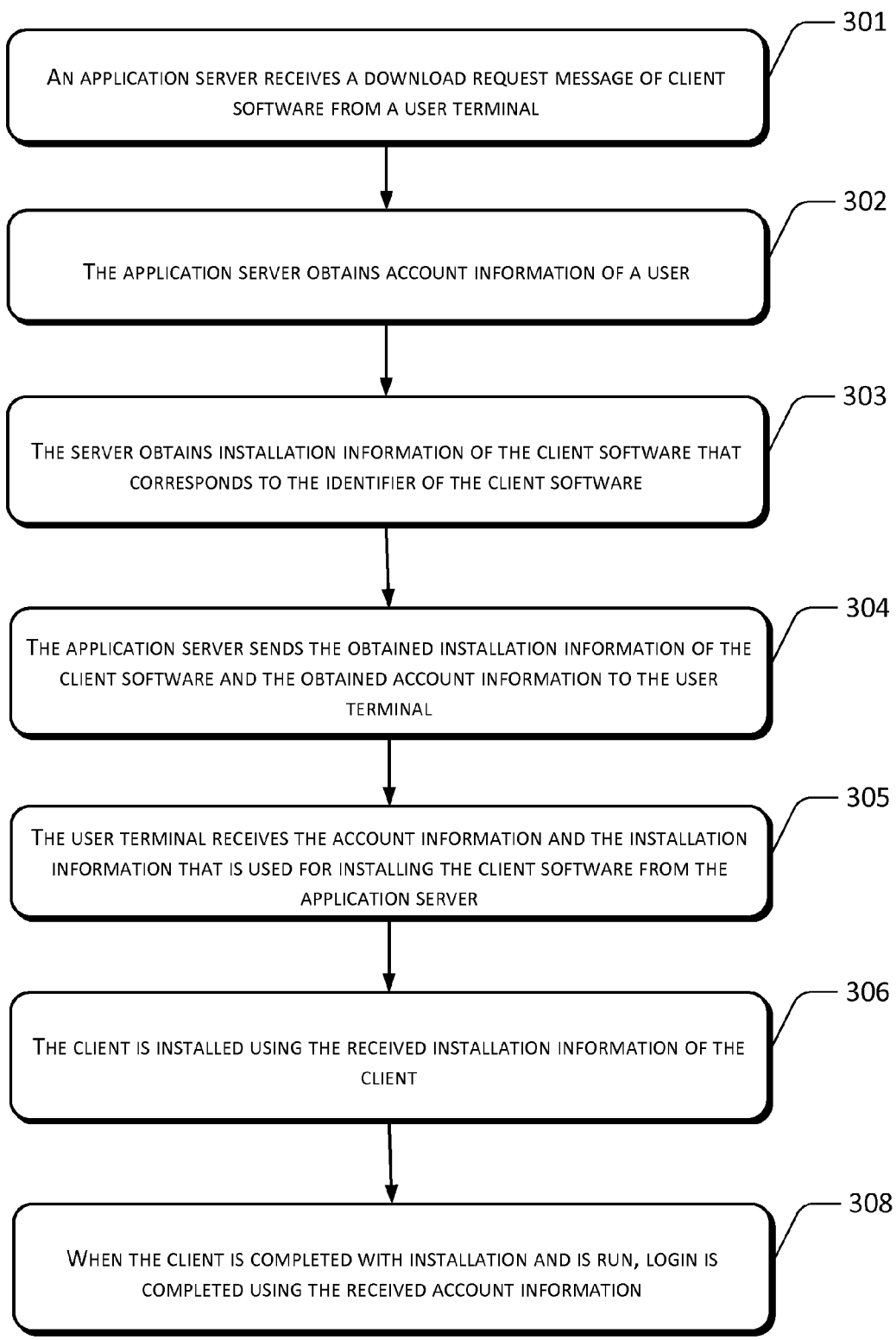
FIG. 3 is a flowchart illustrating a method of downloading and installing a client in accordance with a third embodiment of the present disclosure.

FIG. 3 is a flowchart illustrating a method of downloading and logging into a client in accordance with the third embodiment of the present disclosure. The third embodiment of the present disclosure, the first embodiment of the present disclosure, and the second embodiment of the present disclosure are developed under a same inventive concept. The third embodiment of the present disclosure is described herein using an example in which a client is downloaded from an application server which belongs to a same Internet provider of the client to be downloaded. The method includes:

Block 301: An application server receives a download request message of client software from a user terminal.

The download request message includes an identifier of the client software.

Optionally, the download request message of the client software further includes additional information.

The additional information is used for representing event information that indicates a need to use the client software to perform a subsequent operation.

Block 302: The application server obtains account information of a user.

At block 302, after receiving the download request message from the user, the application server obtains login status information of the user with respect to the application server, and determines the account information of the user based on the obtained login status information of the user.

The login status information of the user logs with respect to the application server includes a status of having already logged in and a status of having not logged in.

When the obtained login status information of the user with respect to the application server corresponds to a status of having already logged in, login account information which is used by the user to log in the application server is determined, and block 303 is performed.

In other words, the time when the user requests for downloading the client, the user has logged into the application server. In this case, the application server may use the login account information that the user has used for login as the account information used by the user to subsequently log in the downloaded client, thus avoiding the user to re-register the account information during subsequent use of the client and reducing the data volume of the account information stored in the application server.

When the obtained login status information of the user with respect to the application server corresponds to a status of not having logged in, a login page is pushed to the user to facilitate the user to complete a login operation through the login page. When the user is in the status of having logged in, login account information which is used by the user to log in the application server is determined, and block 303 is performed.

Optionally, the login page further includes a page for performing a fast registration operation for a user who accesses the application server for the first time to perform account registration. When the user is in the status of having logged in, login account information which is used by the user to log in the application server is determined, and block 303 is performed.

As such, using the solutions of the present disclosure can avoid a situation in which the user performs registration for different clients for multiple times, thus improving usage experience of the user with respect to the client.

The login account information includes, but is not limited to, user name information and login password information.

Block 303: The server obtains installation information of the client software that corresponds to the identifier of the client software.

At block 303, the server searches for and obtains the installation information that corresponds to the identifier of the client software based on the identifier of the client software.

Block 304: The application server sends the obtained installation information of the client software and the obtained account information to the user terminal.

Optionally, at block 304, when the received download request message further includes additional information, the application server sends the received additional information, the obtained account information, and the obtained installation information of the client software that corresponds to the identifier of the client software to the user terminal.

It should be noted that, when the received download request message does not include the additional information, the application server may further determine, using the obtained login account information of the user, whether event information indicating a need of using the client software to perform a subsequent operation is generated in the application server before the user sends the download request message of the client software. If event information exists, the application server packages the event information that indicates a need of using the client software to perform a subsequent operation and that is generated in the application server as the additional information, and sends the additional information, the obtained account information, and the obtained installation information of the client to the user terminal.

At block 305: The user terminal receives the account information and the installation information that is used for installing the client software from the application server.

The account information received from the application server corresponds to login information used by the user to log in the application server which belongs to a same Internet operator of the client to be installed.

Optionally, the additional information is received from the application server.

Block 306: The client is installed using the received installation information of the client.

Block 307: When the client is completed with installation and is started, login is completed using the received account information.

Specifically, at block 307, the account information received from the application server corresponds to login information used by the user to log in the application server which belongs to a same Internet operator of the client to be installed. Therefore, when the client is completed with installation and is started, a login request message is sent to the application server, and the client is logged in after a message indicating successful verification of the login information is returned by the application server.

Optionally, when the client is completed with the installation and is started, the method further includes:

after the user logs into the client using the received account information, loading the received additional information to the client, and performing the subsequent operation.

Fourth Embodiment

Figure 4:
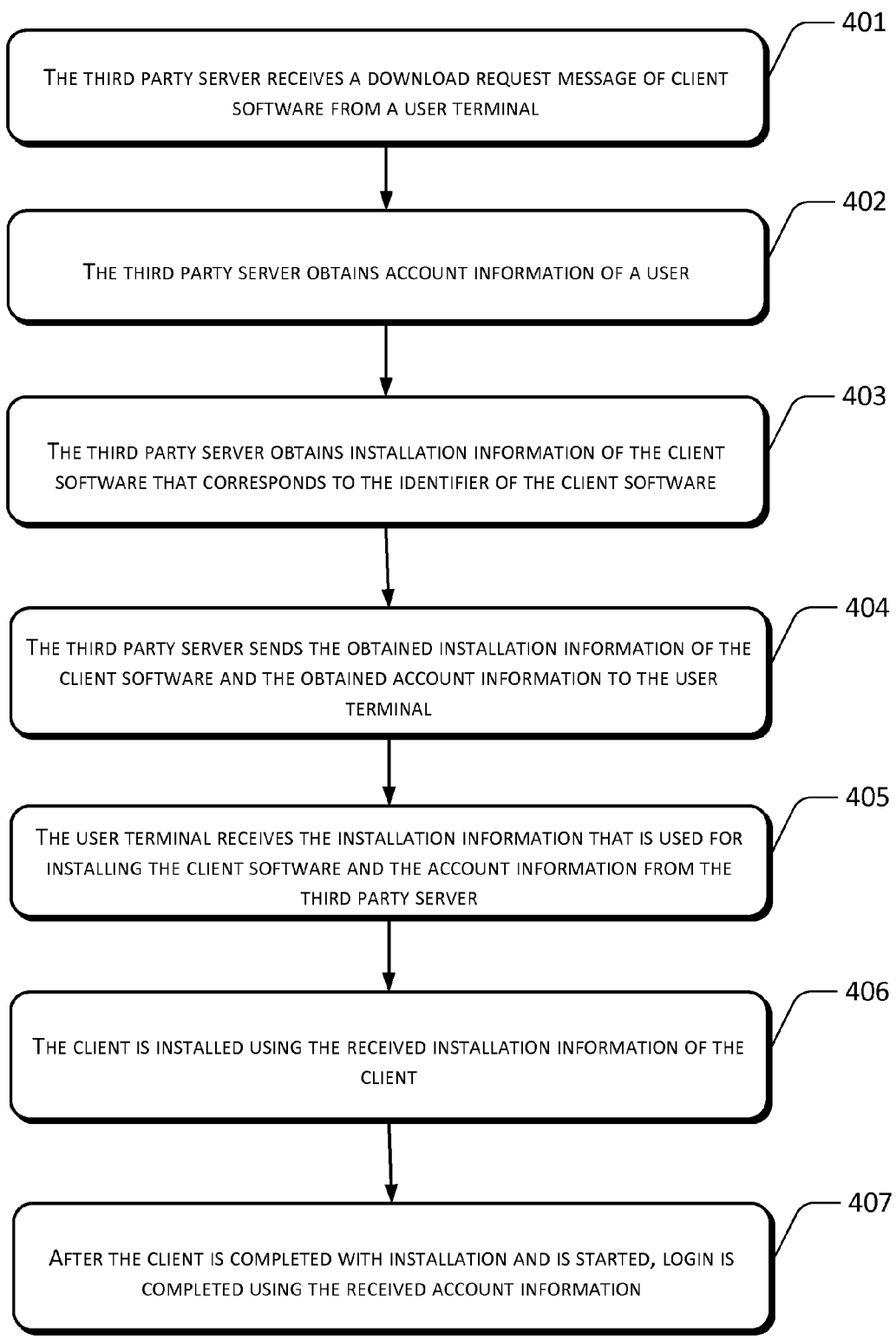
FIG. 4 is a flowchart illustrating a method of downloading and installing a client in accordance with a fourth embodiment of the present disclosure.

FIG. 4 is a flowchart illustrating a method of downloading and logging in a client in accordance with the fourth embodiment of the present disclosure. The fourth embodiment of the present disclosure, the first embodiment of the present disclosure, and the second embodiment of the present disclosure are developed under a same inventive concept. The fourth embodiment of the present disclosure is described hereinafter using an example in which a client is downloaded from a third party server which is delegated by a developer of a client to be downloaded to specially perform installation and downloading. The method includes:

Block 401: The third party server receives a download request message of client software from a user terminal.

The download request message of the client software includes an identifier of the client software.

Block 402: The third party server obtains account information of a user.

At block 402, a method of obtaining the account information of the user by the third-party server includes, but is not limited to, the following method:

after receiving a download request message from the user, the third party server obtaining login account information which is used by the user to log in the third party server.

Specifically, the third party server obtains login status information of the user with respect to the third party server, and determines the login account information which is used by the user to log in the third party server.

The login status information of the user logs with respect to the third party server includes status information of having logged in and status information of having not logged in.

When the obtained login status information of the user with respect to the third party server is the status information of having logged in, the login account information which is used by the user to log in the third party server is determined, and block 403 is performed.

Alternatively, when the obtained login status information of the user with respect to the third party server is the information of having not logged in, a login page is pushed to the user, so that the user completes a login operation via the login page, and when the user is in a logged-in status, the login account information which is used by the user to log in the third party server is determined, and block 403 is performed.

Optionally, the login page further includes a page for performing a fast registration operation for a user who accesses the third party server for the first time to perform account registration. When the user is in a logged-in state, the login account information which is used by the user to log in the third party server is determined, and block 403 is performed.

Block 403: The third party server obtains installation information of the client software that corresponds to the identifier of the client software.

At block 403, the third party server searches for and obtains, based on the identifier of the client software, the installation information corresponding to the identifier of the client software.

Block 404: The third party server sends the obtained installation information of the client software and the obtained account information to the user terminal.

Optionally, at block 404, when the received download request message further includes additional information, the third party server sends the received additional information, the obtained account information, and the obtained installation information, of the client software that corresponds to the identifier of the client software to the user terminal.

Block 405: The user terminal receives the installation information that is used for installing the client software and the account information from the third party server.

It should be noted that, the account information received by the user terminal from the third party server is the login information used by the user to log in the third party server which is delegated by the developer of the installed client to specially perform installation and downloading.

In addition, the user terminal determines that identifier information or address information of the third party server for downloading client software is received.

Optionally, the user terminal further receives additional information from the third party server, the additional information being used for representing event information that indicates a need to use the client software to perform a subsequent operation.

Block 406: The client is installed using the received installation information of the client.

Block 407: After the client is completed with installation and is started, login is completed using the received account information.

Specifically, at block 407, when the received account information corresponds to the login information used by the user to log in the third party server which is delegated by the developer of the installed client to specially perform installation and downloading, completing login using the account information includes:

First, send a login request message to an application server.

The application server is an application server which belongs to a same Internet operator of the client, and is used for processing login requests of users.

The login request message includes the account information, i.e., the account information corresponding to the login information used by the user to log in the third party server which is delegated by the developer of the installed client to specially perform installation and downloading.

It should be noted that, the login request message further includes the identifier information or the address information of the third party server.

Second, the application server determines whether the received account information is locally stored account information, and upon determining that the received account information is not the locally stored account information, the application server sends a message for verification the account information to the third party server based on the identifier information or the address information of the third party server included in the login request message.

Finally, after receiving a message indicating successful verification of the account information returned from the third party server, complete the login.

The message indicating the successful verification of the account information authentication is sent to the application server after the third party server receives the message of verifying the account information, performs verification for the received account information and passes the verification.

Optionally, the received message sent from the server further includes additional information.

The additional information is used for representing event information that indicates a need of using the installed client to perform a subsequent operation.

When the client is completed with installation and is started, the method further includes:

after the user logs into the client using the received account information, loading the received additional information to the client, and performing the subsequent operation.

Fifth Embodiment

Figure 5:
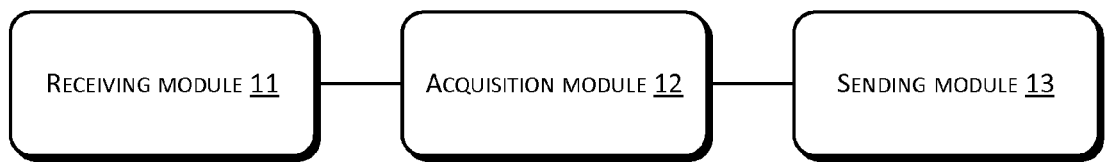
FIG. 5 is a structural diagram illustrating a server in accordance with a fifth embodiment of the present disclosure.

FIG. 5 is a structural diagram illustrating a server in accordance with the fifth embodiment of the present disclosure. The fifth embodiment of the present disclosure is developed under a same inventive concept as the first embodiment to the fourth embodiment of the present disclosure. The server includes: a receiving module 11, an acquisition module 12, and a sending module 13.

The receiving module 11 is used for receiving a download request message of client software from a user terminal, the download request message including an identifier of the client software.

The acquisition module 12 is used for obtaining account information of a user and installation information of the client software that corresponds to the identifier of the client software.

The sending module 13 is used for sending the obtained installation information of the client software that corresponds to the identifier of the client software and the obtained account information to the user terminal.

Specifically, the acquisition module 12 is specifically used for determining the account information of the user based on login status information of the user with respect to the server.

The acquisition module 12 is specifically used for: when the login status information of the user with respect to the server corresponds to information indicating a status of having logged in, determining login account information which is used by the user to log in the server; and when the login status information of the user with respect to the server corresponds to information indicating a status of having not logged in, pushing a login page to the user terminal, and determining, via the login page, the login account information which is used by the user to log in the server.

Optionally, the download request message of the client software further includes additional information, where the additional information is used for representing event information that indicates a need to use the client software to perform a subsequent operation.

The sending module 13 is specifically used for sending the received additional information, the obtained installation information of the client software and the obtained account information to the user terminal.

It should be noted that, the server described in the fifth embodiment of the present disclosure may be an integrated module in a server or a physical entity in the server, which is not limited herein.

Sixth Embodiment

Figure 6:
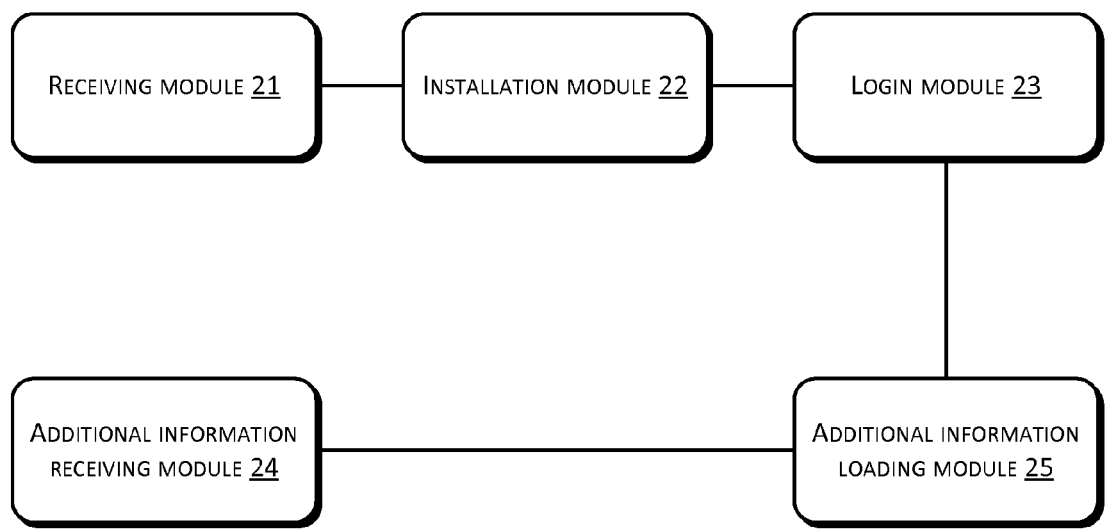
FIG. 6 is a structural diagram illustrating a client device in accordance with a sixth embodiment of the present disclosure.

FIG. 6 is a structural diagram illustrating a client device (such as a user terminal) in accordance with the sixth embodiment of the present disclosure. The sixth embodiment of the present disclosure is developed under a same inventive concept as the first embodiment to the fourth embodiment of the present disclosure. The client device includes: a receiving module 21, an installation module 22, and a login module 23.

The receiving module 21 is used for receiving account information and installation information that is used for installing client software from a server.

The installation module 22 is used for installing the client using the received installation information of the client.

The login module 23 is used for completing login using the received account information when the client is completed with installation and is started.

The login module 23 is specifically used for sending a login request message to an application server, the application server being used for processing login requests of users, where the login request message includes the account information; and completing login when a message indicating successful verification of the account information is received from the application server.

Logging into the client using the received account information further includes sending the received account information to the application server for verification to ensure the security of the user to log in the client.

The login module 23 is specifically used for sending the login request message to the application server, the application server being used for processing login requests of users, where the login request message includes the account information of the user and identifier information or address information of the server. The application server determines whether the received account information is locally stored account information, sends a message for verifying the account information to the server based on the identifier information or the address information of the server in response to determining that the received account information is not the locally stored account information, and completes a login upon receiving a message indicating successful verification the account information returned from the server, where the message indicating the successful verification of the account information is sent to the application server after the server performs and passes the verification based on the received account information.

Logging into the client using the received account information further includes sending the received account information to a third party server for verification to ensure the security of the user to log in the client.

The client device further includes: an additional information receiving module 24, where the additional information receiving module 24 is used for receiving additional information sent from the server, where the additional information is used for representing event information that indicates a need of using the client software to perform a subsequent operation.

The client device further includes: an additional information loading module 25, where the additional information loading module 25 is used for loading the received additional information to the client and performing the subsequent operation after the client is completed with installation and is started and the client is logged in using the received account information.

It should be noted that, the client described in the sixth embodiment of the present disclosure may be an integrated module in a terminal device or a physical entity in the terminal device, which is not limited herein.

One skilled in the art should understand that the embodiments of the present disclosure may be implemented as methods, apparatuses (devices), or products of computer programs. Therefore, the present disclosure may be implemented in forms of hardware, software, or a combination of hardware and software. Further, the present disclosure may be implemented in the form of products of computer programs executable on one or more computer readable storage media (including, but not limited to, a disk storage device, a CD-ROM, an optical storage device, etc.) that include computer readable program instructions.

Figure 7:
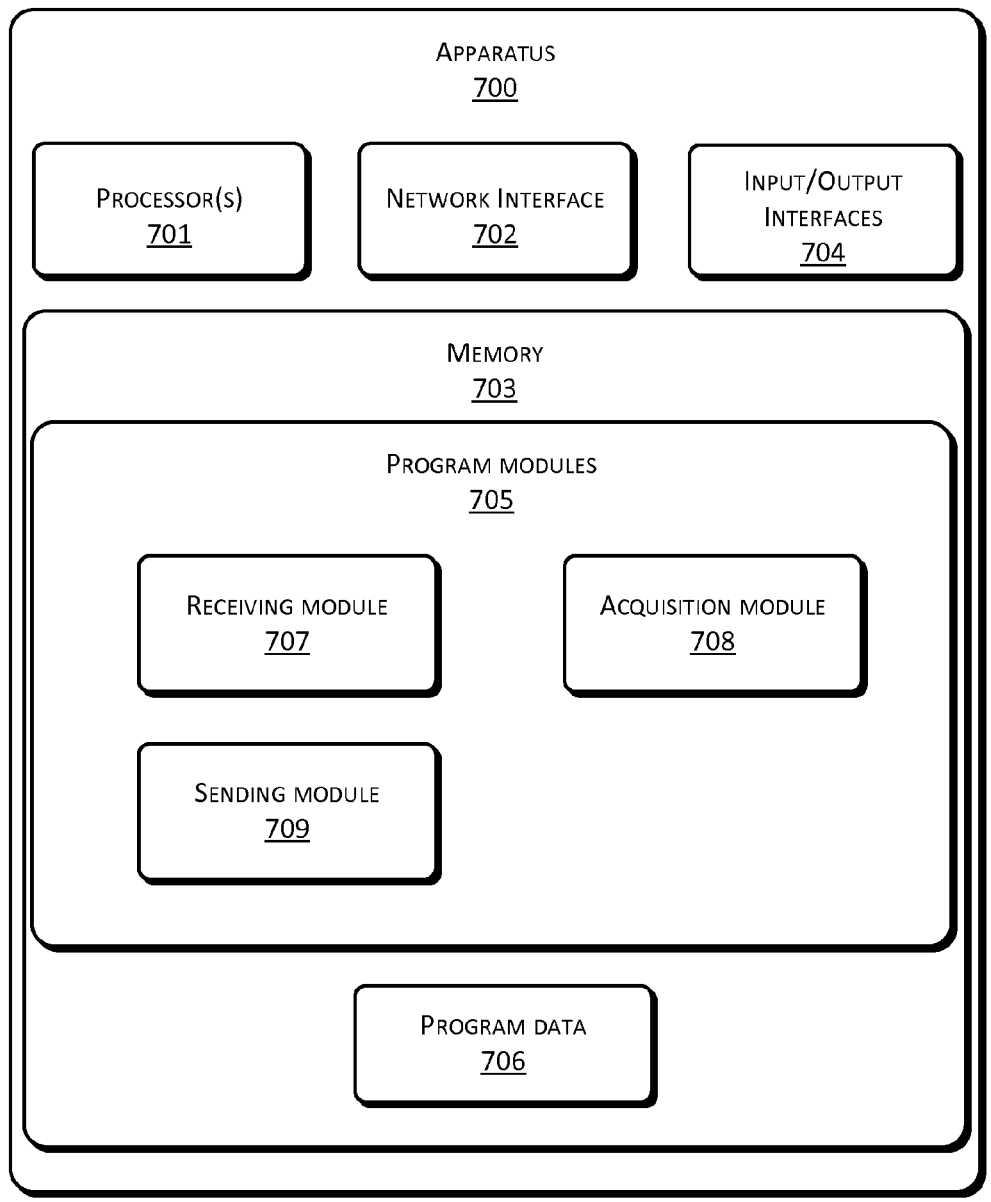
FIG. 7 is a structural diagram illustrating the server as described in FIG. 5 in detail.

For example, FIG. 7 illustrates an example apparatus 700, such as the servers as described above, in more detail. In one embodiment, the apparatus 700 can include, but is not limited to, one or more processors 701, a network interface 702, memory 703, and an input/output interface 704.

The memory 703 may include computer-readable media in the form of volatile memory, such as random-access memory (RAM) and/or non-volatile memory, such as read only memory (ROM) or flash RAM. The memory 703 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 703 may include program modules 705 and program data 706. In one embodiment, the program modules 705 may include a receiving module 707, an acquisition module 708 and a sending module 709. Details about these program modules may be found in the foregoing embodiments described above.

Figure 8:
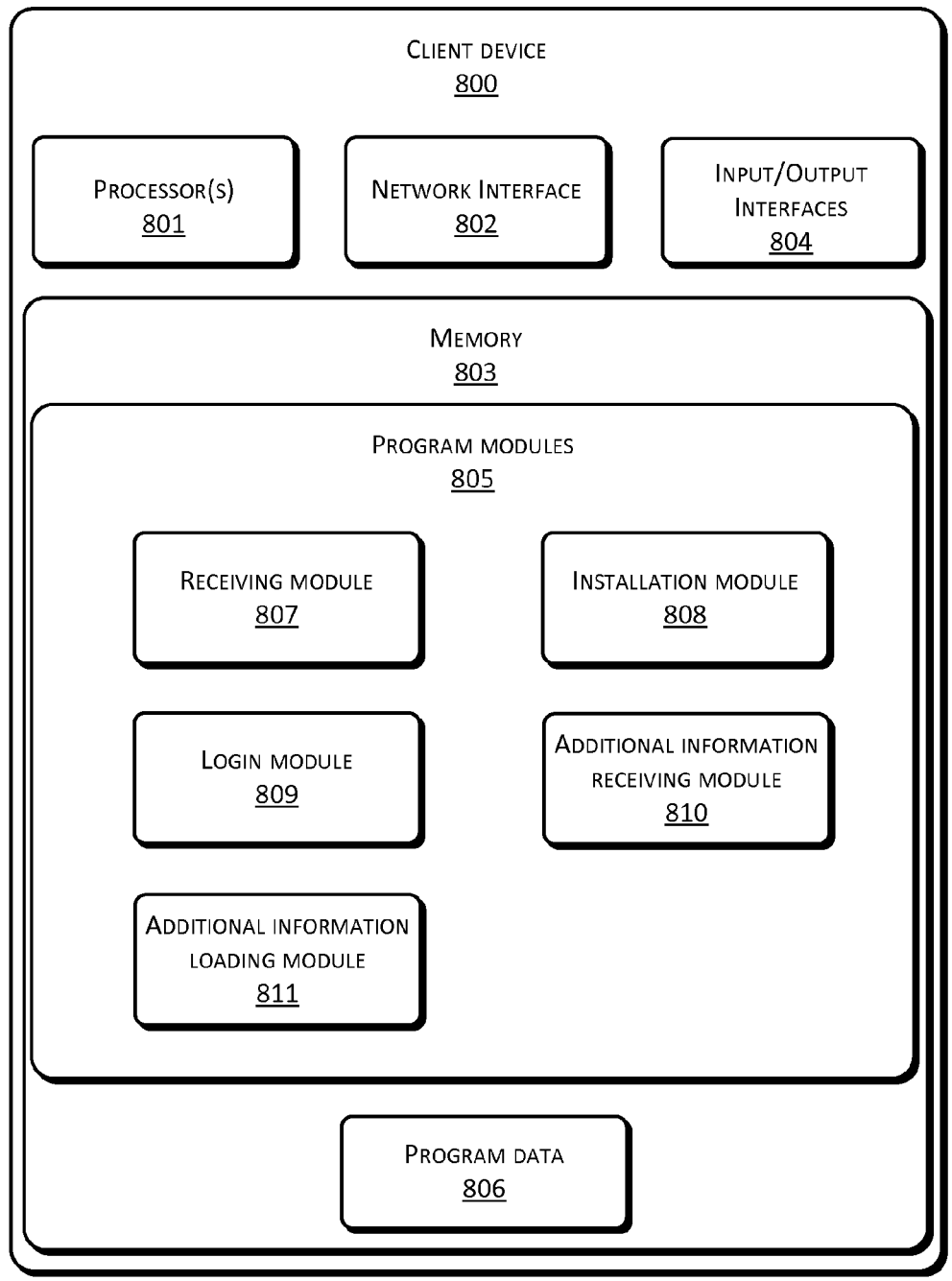
FIG. 8 is a structural diagram illustrating the client device as described in FIG. 6 in detail.

For another example, FIG. 8 illustrates an example client device 800, such as the client devices and/or the user terminals as described above, in more detail. In one embodiment, the client device 800 can include, but is not limited to, one or more processors 801, a network interface 802, memory 803, and an input/output interface 804. The memory 803 may include computer-readable media as described above.

The memory 803 may include program modules 805 and program data 806. In one embodiment, the program modules 805 may include a receiving module 807, an installation module 808, a login module 809, an additional information receiving module 810 and an additional information loading module 811. Details about these program modules may be found in the foregoing embodiments described above.

The present disclosure is described in accordance with flowcharts and/or block diagrams of the exemplary methods, apparatuses (devices) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate computer implemented processing. Therefore, the instructions executed by the computer or the other programmable apparatus may be used to implement one or more processes of the flowcharts and/or one or more blocks of the block diagrams.

Although preferred embodiments of the present disclosure are described, persons skilled in the art can make additional changes and modifications to the embodiments once they know basic creative concepts. Therefore, the appended claims are intended to be construed as including the preferred embodiments and all changes and modifications falling within the scope of the present disclosure.

Apparently, one skilled in the art may make changes and modifications of the present disclosure without departing from the spirit and scope of the present disclosure. If these changes and modifications are within the scope of the claims and their equivalents of the present disclosure, the present disclosure intends to covers such changes and modifications.

What is claimed is:

1. A computer-implemented method of downloading a client software, comprising:

receiving, by a server, a download request message of client software from a user terminal, wherein the download request message comprises an identifier of the client software;

obtaining, by the server, account information of the user and installation information of the client software that corresponds to the identifier of the client software, wherein obtaining the account information includes determining login account information of the user based on login status information of the user with respect to the server;

transmitting, by the server over a network to the user terminal, the obtained installation information of the client software that corresponds to the identifier of the client software and together with the obtained account information, the account information including login information;

logging into the client software directly using the received account information after completing installation of the client software and without having to re-register the account information, the logging into the client including, sending a login request message to the server for verification based on the identifier information or address information of the server, wherein the login request message includes the account information and identifier information or address information of the server;

upon determining, by the server, that the received account information is not the locally stored account information, sending a message for verifying the account information to the server based on the identifier information or address information of the server; and completing login upon receiving the message indicating successful verification of the account information returned from the server, wherein the message indicating the successful verification of the account information is sent to the server after the server performs and passes verification based on the received account information, wherein the server comprises one or more processors and a memory storing executable instructions that, when executed by the one or more processors, cause the one or more processors to transmit the installation information of the client software and the account information to the user terminal.

2. The computer-implemented method of claim 1, wherein the determining, by the server, the account information of the user based on the login status information of the user with respect to the server, comprises when the login status information of the user with respect to the server corresponds to status information of having logged in, determining login account information which is used by the user to log in the server.

3. The computer-implemented method of claim 1, wherein the determining, by the server, the account information of the user based on the login status information of the user with respect to the server, comprises when the login status information of the user with respect to the server corresponds to status information of having not logged in, pushing a login page to the user terminal, and determining, via the login page, the login account information which is used by the user to log in the server.

4. The computer-implemented method of claim 1, wherein the download request message of the client software further comprises additional information, the additional information being used for representing event information that indicates a need of using the client software to perform a subsequent operation.

5. The computer-implemented method of claim 4, wherein transmitting, by the server over a network to the user terminal, the obtained installation information of the client software together with and the obtained account information, comprises: transmitting, by the server over the network to the user terminal, the additional information, together with the obtained installation information of the client software and the obtained account information.

6. A user terminal device comprising: one or more processors;
a memory storing executable instructions that, when executed by the one or more processors, cause the one or more processors to perform acts comprising:
sending a download request message of client software to a server, wherein the download request message comprises an identifier of the client software;
receiving account information of a user and together with installation information of a client software corresponding to the identifier of the client software that is used for installing client software from the server, wherein the account information and the installation information are obtained by the server, wherein obtaining the account information by the server includes determining login account information of the user, and wherein the account information and installation information are transmitted together by the server over a network to the user terminal, the account information including login information, wherein obtaining the account information includes determining login account information of the user based on login status information of the user with respect to the server;
installing the client software using the received installation information; and
after completing the installation of the client software and the client software is started, completing login using the received account information without having to reregister the account information, the login including sending the account information to a server for verification;
wherein completing the login comprises sending a login request message to an application server for verification based on the identifier information or address information of the server, the application server being used for processing login requests of users, wherein the login request message comprises the account information of the user and identifier information or address information of the server from which the account information and the installation information of the client software is received;
wherein completing the login further comprises determining, by the application server, whether the received account information is locally stored account information, and upon determining that the received account information is not the locally stored account information, sending a message for verifying the account information to the server from which the account information and the installation information of the client software is received based on the identifier information or the address information; and
wherein completing the login further comprises upon receiving a message indication successful verification of the account information returned from the application server, completing the login, wherein the message indicating the successful verification of the account information is sent to the server after the server performs and passes verification based on the received account information.

7. The user terminal of claim 6, wherein the acts further comprise:
receiving additional information from the server, wherein the additional information is used for representing event information that indicates a need of using the client software to perform a subsequent operation.

8. The user terminal of claim 7, wherein after completing the installation of the client software and the client software is started, the acts further comprise;
after the user logs into the client software using the received account information, loading the received additional information and performing the subsequent operation.

9. One or more computer readable media storing executable instructions that, when executed by one or more processors, cause the one or more processors to perform acts comprising:
receiving, by a server, a download request message of client software from a user terminal, wherein the download request message comprises an identifier of the client software;
obtaining, by the server, account information of the user and installation information of the client software that corresponds to the identifier of the client software, wherein obtaining the account information includes determining login account information of the user based on login status information of the user with respect to the server;
transmitting, by the server over a network to the user terminal, the obtained installation information of the client software that corresponds to the identifier of the client software and together with the obtained account information, the account information including login information;
logging into the client software directly using the received account information after completing installation of the client software and without having to re-register the account information, the logging into the client software including sending a login request message to the server for verification based on the identifier information or address information of the server, wherein the login request message includes the account information and identifier information or address information of the server;

upon determining, by the server, that the received account information is not the locally stored account information, sending a message for verifying the account information to the server based on the identifier information or address information of the server; and completing login upon receiving the message indicating successful verification of the account information returned from the server, wherein the message indicating the successful verification of the account information is sent to the server after the server performs and passes verification based on the received account information, wherein the server comprises one or more processors and a memory storing executable instructions that, when executed by the one or more processors, cause the one or more processors to transmit the installation information of the client software and the account information to the user terminal.

10. The one or more computer-readable media of claim 9, wherein the determining, by the server, the account information of the user based on the login status information of the user with respect to the server, comprises when the login status information of the user with respect to the server corresponds to status information of having logged in, determining login account information which is used by the user to log in the server.

11. The one or more computer-readable media of claim 9, wherein the determining, by the server, the account information of the user based on the login status information of the user with respect to the server, comprises when the login status information of the user with respect to the server corresponds to status information of having not logged in, pushing a login page to the user terminal, and determining, via the login page, the login account information which is used by the user to log in the server.

12. The one or more computer-readable media of claim 9, wherein the download request message of the client software further comprises additional information, the additional information being used for representing event information that indicates a need of using the client software to perform a subsequent operation.

13. The one or more computer-readable media of claim 12, wherein transmitting, by the server over the network to the user terminal, the obtained installation information of the client software and together with the obtained account information to the user terminal by the server, comprises transmitting, by the server over the network to the user terminal, the additional information, together with the obtained installation information of the client software and the obtained account information.

* * * * *